(12) United States Patent
Uszkoreit et al.

(10) Patent No.: US 9,177,553 B1
(45) Date of Patent: Nov. 3, 2015

(54) IDENTIFYING UNDERSERVED COMMAND INPUTS

(71) Applicant: Google Inc., Mountain View, CA (US)

(72) Inventors: Jakob D. Uszkoreit, San Francisco, CA (US); Percy Liang, Palo Alto, CA (US); Daniel M. Bikel, Mount Kisco, NY (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 13/926,943

(22) Filed: Jun. 25, 2013

(51) Int. Cl.
*G06F 17/27* (2006.01)
*G10L 15/22* (2006.01)

(52) U.S. Cl.
CPC .............. *G10L 15/22* (2013.01); *G06F 17/27* (2013.01); *G06F 17/274* (2013.01); *G06F 17/2705* (2013.01); *G06F 17/2785* (2013.01)

(58) Field of Classification Search
CPC . G06F 17/2785; G06F 17/27; G06F 17/2705; G06F 17/274
See application file for complete search history.

(56) References Cited

U.S. PATENT DOCUMENTS

| | | | |
|---|---|---|---|
| 5,212,821 A | 5/1993 | Gorin et al. | |
| 5,761,631 A * | 6/1998 | Nasukawa | 704/9 |
| 5,797,123 A | 8/1998 | Chou et al. | |
| 6,446,081 B1 * | 9/2002 | Preston | 1/1 |
| 6,567,778 B1 * | 5/2003 | Chao Chang et al. | 704/257 |
| 6,631,346 B1 * | 10/2003 | Karaorman et al. | 704/9 |
| 2002/0059056 A1 * | 5/2002 | Appleby | 704/4 |
| 2006/0190261 A1 | 8/2006 | Wang | |
| 2008/0162447 A1 * | 7/2008 | Ritter et al. | 707/5 |
| 2012/0290509 A1 | 11/2012 | Heck et al. | |

FOREIGN PATENT DOCUMENTS

| | | |
|---|---|---|
| EP | 834862 A2 | 4/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

Chen et al., "Diverse Topic Phrase Extraction from Text Collection" WWW 2006, 9 pages.

Gorin et al., "An Experiment in Spoken Language Acquisition", IEEE Transactions on Speech and Audio Processing, 2 (1)(II), 1994, pp. 224-240.

(Continued)

*Primary Examiner* — Samuel G Neway
(74) *Attorney, Agent, or Firm* — Fish & Richardson P.C.

(57) ABSTRACT

A language processing system identifies first command input sentences that do not successfully parse by any parsing rule in a set of parsing rules. Each of the parsing rules is associated with an action, and a user device performs the action associated with a parsing rule in response to an input sentence being successfully parsed by the parsing rule. For each of these identified first sentences, the system determines whether the first input sentence has an underserving signal that is indicative of one or more actions being underserved. If the first sentence has the underserving signal, then the first sentence is selected as a candidate input sentence. Each candidate input sentence is provided to an action analysis processes that determines whether a candidate input sentence is to be associated with one action, and upon a positive determination generates a parsing rule for the candidate input sentence.

20 Claims, 4 Drawing Sheets

(56) References Cited

OTHER PUBLICATIONS

Gupta et al., "Segmenting Spoken Language Utterances Into Clauses for Semantic Classification" in Automatic Speech Recognition and Understanding (ASRU 2003), 2003 IEEE Workshop, pp. 525-530.
Kawahara et al., "Topic Independent Language Model for Key-Phrase Detection and Verification", Acoustics, Speech, and Signal Processing, 1999, 1999 IEEE International Conference, pp. 685-688.
Krulwich et al., "Learning user information interests through the extraction of semantically significant phrases" AAAI Technology Report SS-96-05, Compilation, pp. 110-112.
Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.
Lehuen et al., "A Robust Semantic Parser Designed for Spoken Dialog Systems" in 2010 IEEE Fourth International Conference on Semantic Computing (ICSC), 2010, pp. 52-55.
Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.
Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.
Wu et al., "KIP: A Keyphrase Identification Program with Learning Functions" in Proceedings of the International Conference on Information Technology: Coding and Computing (ITCC'04), vol. 2, 5 pages.
Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

IDENTIFYING UNDERSERVED COMMAND INPUTS

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system develops parsing rules for various commands a user will speak. Upon a successful parse of a command input by a rule, the action is performed (or may be performed subject to user confirmation).

Users, however, can articulate commands for a particular action in many different ways. Thus, the provider of the speech recognition and processing system cannot anticipate beforehand all possible commands that will be received, and thus cannot generate all possible parsing rules beforehand. Accordingly, some commands may not parse for a particular action.

SUMMARY

In general, one innovative aspect of the subject matter described in this specification can be embodied in methods that include the actions of accessing command input logs storing data defining received input sentences, each input sentence being one or more n-grams; identifying from the input sentences first input sentences that do not successfully parse by any parsing rule in a set of parsing rules, each of the parsing rules being associated with an action, and wherein a user device performs the action associated with a parsing rule in response to an input sentence received from the user device being successfully parsed by the parsing rule; for each first input sentence, determining whether the first input sentence has an underserving signal, the underserving signal being a signal that is indicative of one or more actions being underserved; and selecting first input sentences determined to have an underserving signal as candidate input sentences; and providing each candidate input sentence to an action analysis processes that determines whether a candidate input sentence is to be associated with one of a plurality of actions and upon a positive determination generates a parsing rule for the candidate input sentence, wherein the parsing rule is associated with the action and a successful parse of an input sentence by the parsing rule causes a user device from which the input sentence is received to perform the action associated with the parsing rule. Other embodiments of this aspect include corresponding systems, apparatus, and computer programs, configured to perform the actions of the methods, encoded on computer storage devices.

By utilizing crowdsourcing techniques from log data, underserved command inputs emerge for analysis to consider whether parse rules for the command inputs are needed. Accordingly, new parses for an underserved command inputs for particular actions emerge without requiring detailed studies of commands, or generation of additional command inputs by evaluators. This reduces the overall parse model update costs and maintenance time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A language processing system identifies first command input sentences that do not successfully parse by any parsing rule in a set of parsing rules. Each of the parsing rules is associated with an action, and a user device performs the action associated with a parsing rule in response to an input sentence being successfully parsed by the parsing rule. For each of these identified first sentences, the system determines whether the first input sentence has an underserving signal that is indicative of one or more actions being underserved. If the first sentence has the underserving signal, then the first sentence is selected as a candidate input sentence. Each candidate input sentence is provided to an action analysis processes that determines whether a candidate input sentence is to be associated with one action, and upon a positive determination generates a parsing rule for the candidate input sentence.

Figure 1:
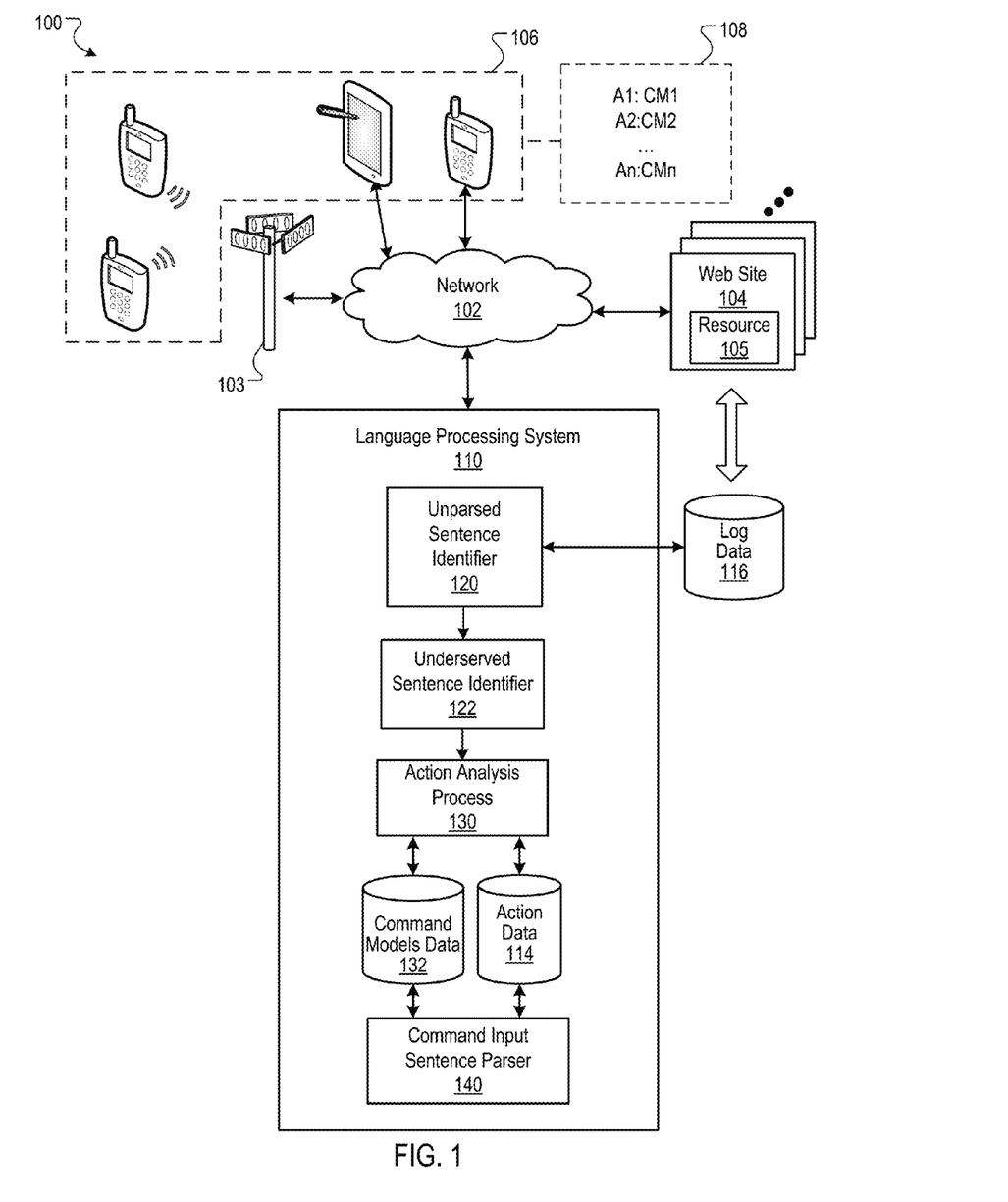
FIG. 1 is a block diagram of an environment in which underserved command inputs are identified and processed.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

In addition to providing content, particular websites 104 may also provide one or more services. Example services include a search service provided by a search engine, video serving provided by video hosting servers, a mapping service providing by a map server, and so on.

A user device 106 is an electronic device that is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 5 below. The user devices 106 may communicate over the networks 102 and 103 by means of wired and wireless connections.

As described with reference to FIG. 5, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service.

In some implementations, the user device 106 utilizes a voice recognition system that receives voice command inputs, performs language recognition processing, and parses the resulting recognized words and phrases. The parsed words and phrases, which are referred to as n-grams, where each n-gram may constitute one or more words, are then processed to determine whether the voice input invokes a particular action.

As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. As will be described in more detail below, the command models are, in some implementations, grammars that describe sentence structures for particular commands. Other appropriate command models may also be used.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

In some implementations, the command inputs of user devices 106 are stored in log data 116. The log data 116 stores data defining device sessions, command inputs received during the sessions, and actions taken in response to the command inputs. As used in this description, a device session, or simply a session, is defined by one or more command inputs that are received and grouped together to indicate they occurred during a session. The session can be defined by a variety of appropriate ways. For example, a session may be a set of command inputs received during a predefined time period, e.g., 30 minutes; or may be up to N inputs, e.g., up to 50 inputs; or may be a period during which a user maintained interactions with the user device until an inactivity time out (e.g., five minutes) occurred. Other appropriate criteria to define a session can also be used.

For each command input, the log data 116 also stores data describing actions taken in response to the command input. The data describing actions taken in response to the command input can be, for example, data describing service requests and parameters passed to the service; actions taken at the user device, such as the setting of a calendar entry; etc. Furthermore, some of the command inputs may not directly result in action performed by the user device. This may be the result of a command input not being parsed by rule associated with an action; or being parsed by a rule associated with an action that is not an action the user desires; or for some other reason.

The log data 116 also indicates, for each session, the sequence of command inputs. Ordinal positions of the command inputs for each session can be defined by timestamps, sequence values, or other appropriate data that can be used to derive an ordinal position of a command input relative to other command inputs for a session. The log data 116 can thus be used by the language processing system 110 to determine the respective sequences of command inputs submitted by the user devices, the actions taken in response to the command inputs, and how often the command inputs have been submitted.

In some implementations, a language processing system 110 is used to parse the command input sentence and determine which, if any, action is to be performed. As shown in FIG. 1, the language processing system 110 is separate from the user devices. However, certain features of the language processing system 110 can instead be implemented within each user device, such as the command input sentence parser 140. Furthermore, the example architecture of the language processing system 110 is illustrative only, and other appropriate functional architectures can also be used.

The language processing system 110 receives command input sentences from user devices 106 and provides responsive data back to the user devices. Such responsive data may be, for example, a fully parsed sentence, the action invoked, and arguments to be passed to the service that performs the action.

The language processing system 110 includes command models data 132 that associates actions with corresponding command models by use of parsing rules, such as grammars. The command models data 132 store command models for actions specified by action data 114, and are generated by the action analysis process 130. In some implementations, the command models are each configured to generate an action score for an action for an input sentence based on, for example, a semantic meaning of the input sentence.

In some implementations, the language processing system 110 reviews the logs for command inputs and determines user actions in response to command input. For a particular command input that is not parsed by any rule associated with an action, and has sufficient co-occurrence of an underserving signal, the command input is selected as a candidate to be an actionable command input. Thereafter, the query may then be processed to determine if there is a corresponding action that should be generated for it.

Figure 2:
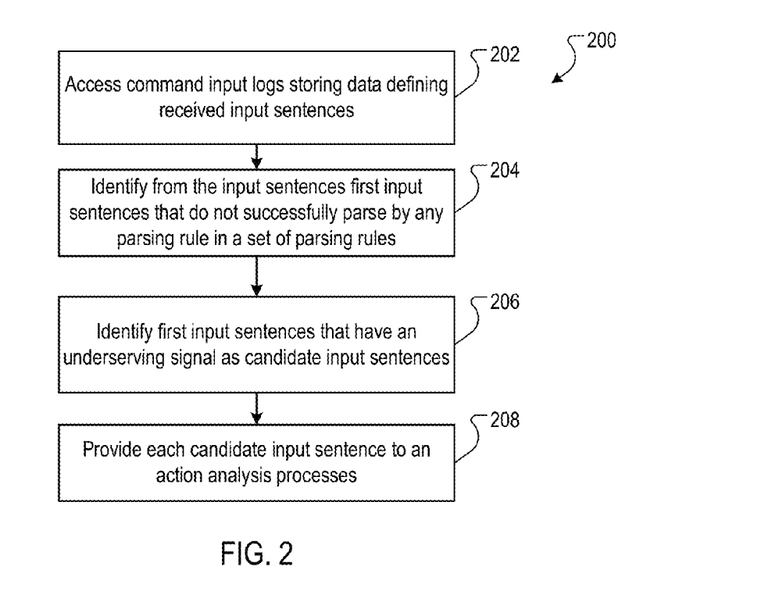
FIG. 2 is a flow diagram of an example process for identifying underserved command inputs.

FIG. 2 is a flow diagram of an example process 200 for identifying underserved command inputs. The process 200 can be implemented in an unparsed sentence identifier 120 and an underserved sentence identifier 122. The unparsed sentence identifier 120 identifies command input sentences that were not successfully parsed by any parsing rule associated with an action, and from those sentences the underserved sentence identifier 122 identifies a proper subset that includes command sentences that each has a signal indicative of being underserved. As used in this description, an underserving signal is a signal derived from data associated with a command input sentence. Such data can be data that is provided to a user device, in response the command input sentence being processed as a search query by a search engine, and/or data based on user interactions in response to the data provided in response to the command input sentence.

The unparsed sentence identifier 120 accesses command input logs storing data defining received input sentences (202). For example, unparsed sentence identifier 120 accesses the log data 116 that includes data defining received input sentences.

The unparsed sentence identifier 120 identifies from the input sentences first input sentences that do not successfully parse by any parsing rule in a set of parsing rules (204). For at least some of the sentences in the log data 116, the parsing rules of the command models data do not parse the sentences successfully. For example, assume the command input sentence of [cancel Tuesday morning alarm] cannot be parsed successfully by any parsing rule in the command models data 132. The unparsed sentence identifier 120 identifies this sentence as an unparsed sentence. Likewise, suppose another sentence—[Battle of the Somme]—also cannot be parsed successfully by any parsing rule in the command models data 132; it too will be identified by the unparsed sentence identifier 120.

The underserved sentence identifier 122 identifies first input sentences that have an underserving signal as candidate input sentences (204). Example ways of determining whether a first input sentence has an underserving signal are described with reference to FIGS. 3, 4A and 4B below. For now, assume the command input sentence [cancel Tuesday morning alarm] is identified as having an underserving signal, while the command input sentence [Battle of the Somme] is not. As a result, only the command input sentence [cancel Tuesday morning alarm] is identified as a candidate input sentence.

The underserved sentence identifier 122 provides each candidate input sentence to action analysis processes (208). For example, the action analysis process 130 can be a supervised or unsupervised machine learning process trained to determine, for each candidate sentence, which action is most likely intended by users, and, upon such determination, generate a parsing rule for the sentence and that is associated with the action. The parsing rule and action association data are then persisted to the command models data 132.

In some implementations, the action analysis process 130 can include a process step that involves human review. For example, candidate sentences are reviewed by human raters to select which action, if any, the sentence should be associated with. Provided an action is identified, a parsing rule is then generated for the sentence and persisted to the command models data 132.

There are a number of appropriate ways the underserved sentence identifier 122 can identify first input sentences that have an underserving signal. Example identification scheme include n-gram analysis for the presence of terms that are semantically relevant for an action; analysis of data provided in response to the command input sentence being executed as a search query; and analysis of data describing user interactions in response to the data provided in response to the command input sentence.

Figure 3:
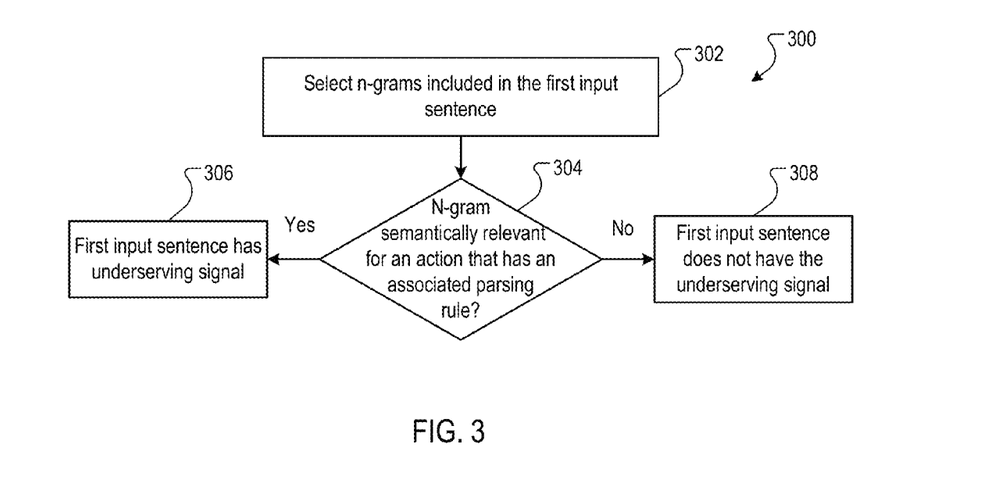
FIG. 3 is a flow diagram of an example process for determining whether an input sentence has an underserving signal based on semantic analysis.

FIG. 3 is a flow diagram of an example process 300 for determining whether an input sentence has an underserving signal based on semantic analysis. The process 300 is performed by the underserved sentence identifier 122.

The underserved sentence identifier 122 selects n-grams included in the first input sentence (302). The n-grams can be unigrams, or can be single terms and phrases of multiple terms, and the n-grams may overlap in terms. For example, for the command input [cancel Tuesday morning alarm], the n-grams may be cancel, Tuesday, Tuesday morning, and alarm.

The underserved sentence identifier 122, for each n-gram, determines whether the n-gram is semantically relevant for an action that has an associated parsing rule (304). For example, for the selected n-grams above, the term "alarm" is determined to be semantically relevant for the "alarm" action, while the remaining n-grams are not determined to be relevant for any actions.

If an n-gram is determined to be semantically relevant for an action that has an associated parsing rule, then the underserved sentence identifier 122 determines the first input sentence has underserving signal (306). For each action for which a semantically relevant n-gram was identified, the command input sentence can be evaluated for the generation of a parsing rule. For example, the command input sentence [cancel Tuesday morning alarm] is evaluated for the generation of a parsing rule. The evaluation may involve determining whether the input sentence should have a parsing rule associated with the action for which one of its n-grams is semantically relevant, or if a new action should be modeled. A machine learned system or human evaluates can make the determination. Here, for example, the command input [cancel Tuesday morning alarm] would result in the determination that a new action should be modeled—the action of alarm cancellation.

Conversely, if no n-gram in the input sentence is determined to be semantically relevant for an action that has an associated parsing rule, then the underserved sentence identifier 122 determines the first input sentence does not have an underserving signal (308).

In some implementations, the underserving signal is also dependent on co-occurrence measure. The higher the co-occurrence measure, the more likely it is that the sentence is underserved. The co-occurrence measure can be interpreted as a signal of how well a sentence expresses a desire to perform an action. The better formed the sentence structure is, the more likely it is that multiple users will use the particular sentence structure. If the co-occurrence measure meets a co-occurrence threshold, then the sentence is determined to be underserved.

Figure 4A:
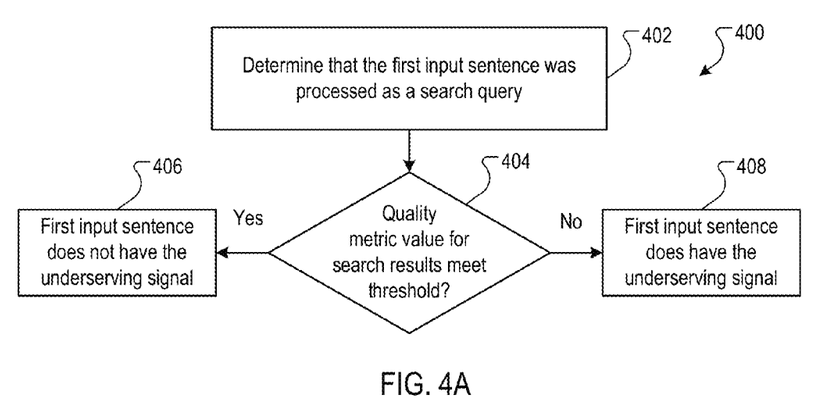
FIG. 4A is a flow diagram of another example process for determining whether an input sentence has an undeserving signal based on search result data.

FIG. 4A is a flow diagram of an example process 400 for determining whether an input sentence has an underserving signal based on semantic analysis. The process 400 can be used to analyze each input sentence for which the parsing rules cannot successfully parse.

Figure 4B:
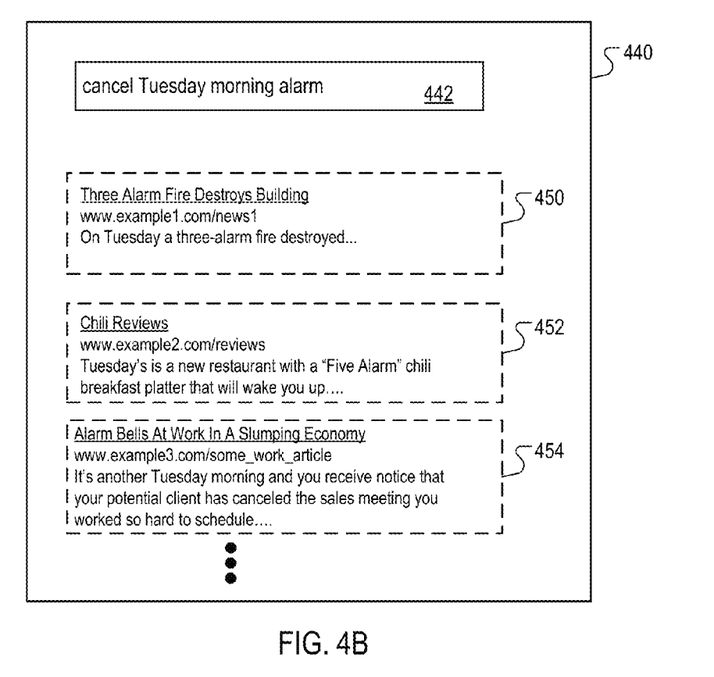
FIG. 4B is an illustration of portion of a user device display in which are displayed data provided in response to a command input.

The underserved sentence identifier 122 determines that the first input sentence was processed as a search query (402). For example, the underserved sentence identifier 122 determines that the command input [cancel Tuesday morning alarm] was processed as a search query. Example data that may have been provided is illustrated in FIG. 4B, which is an illustration of portion of a user device display in which are displayed data provided in response to a command input. As shown in FIG. 4B, the command input [cancel Tuesday morning alarm] is displayed in an input field 442. The input may be the textual output of a speech recognition process, or a typed input by the user.

The command input was not successfully parsed according to a parse rule, and thus the command input is provided as a search query to a search engine external to the user device. In response to the search query, the search engine provides a set of search results 450, 452, and 454. As shown in FIG. 4B, the results cover a variety of topics, as the command input has been interpreted as a search engine query. In the context of a search engine query, the command input does not clearly articulate an informational need, and thus the search results are varied and not highly relevant as compared to search results for queries that clearly express an informational need (e.g., such as the query [Battle of the Somme]).

The underserved sentence identifier 122 determines whether a quality metric value for search results meets threshold (404). A variety of different types of quality measures can be used to make this determination. For example, for data provided in response to a search of a web corpus, in which the data responsive to the search operation are resources identified by search results for the search operation, a quality measure can be derived from quality scores of the resources. Thus, in this implementation, the quality measure is independent of user interactions at the user device from which the first input sentence was received.

The quality scores can be, for example, authority scores of the resources that measure the authority of each resource relative to other resources, relevance scores that measure the relevance of each resource to the command input, or scores based on combinations of authority scores and relevance scores. A similar process can be done for other data provided for other actions, such as quality measure based on quality scores corresponding to book search results.

Another quality measure can be based on user behavior. For example, selection rates of web search results (e.g., search results 450, 452 and 454) can be determined from log data 116. The selection rates can be an average of the top-ranked search results (e.g., the top five search result), or can be highest selection rate from among the search results, etc. Thus in this implementation the quality score is a measure of user satisfaction in response to the search results, and is dependent on user interactions with the search results at the user device from which the first input sentence was received.

The quality score can also be a combination of a score derived from the resources identified by the search and a score derived from user interaction. Other types of quality measures can also be determined and used.

To determine whether the data meets a quality threshold, the underserved sentence identifier 120, in some implementations, compares the derived quality measure to a corresponding predefined threshold value. For example, for a selection rate quality measure, the threshold selection rate may be N %. Furthermore, the predefined value can be set by system administrators, or can be a machine learned value. Alternatively the quality threshold can be a dynamic value that is adjusted based on the underlying data provided.

If the quality metric value for the search results meets the threshold, then the underserved sentence identifier 122 determines the first input sentence does not co-occur with the underserving signal (406). Accordingly, the first input sentence is not selected as a candidate input sentence.

Conversely, if the quality metric value for the search results meets the threshold, then the underserved sentence identifier 122 determines the first input sentence does co-occur with the underserving signal (408). Accordingly, the first input sentence is selected as a candidate sentence for additional processing as described above.

In the example above, assume that for the input sentence [cancel Tuesday morning alarm] neither the quality score derived from the resource scores nor the quality score derived from user interactions meets a threshold. Accordingly, the input sentence is selected as a candidate sentence for additional processing as described above.

There are many types of parsing rules that can be used. In some implementations, the parsing rules are grammar based rules. For example, a grammar for a text action may be of the form:

$G=<T, N, S, R>$;
where:
$T=\{\bullet\}$
$N=\{Contact, Text\_Action, Message\}$
$S=S$
$R=\{$
$S \rightarrow <Contact> <Text\_Action> <Message>$
$Contact \rightarrow <Contact\ List>$
$Text\_Action \rightarrow text, SMS$
$Message \rightarrow \{\bullet\}$
$\}$ The set of terminal T may vary based on the underlying data used to develop the model. For the non-terminal <Contact>, identifiers from a contact list are used. For the non-terminal Text_Action, the terminals "text" and "SMS" are defined, and for the non-terminal message, an open set of terminals is defined. Thus, any sentence of the form:

<Contact> <Text_Action> <Message> will successfully parse to the rule. Because the rule is associated with a text action, a successful parse at a user device will cause the user device to send a text message that includes the residual text after the contact to the user device of the contact.

Figure 5:
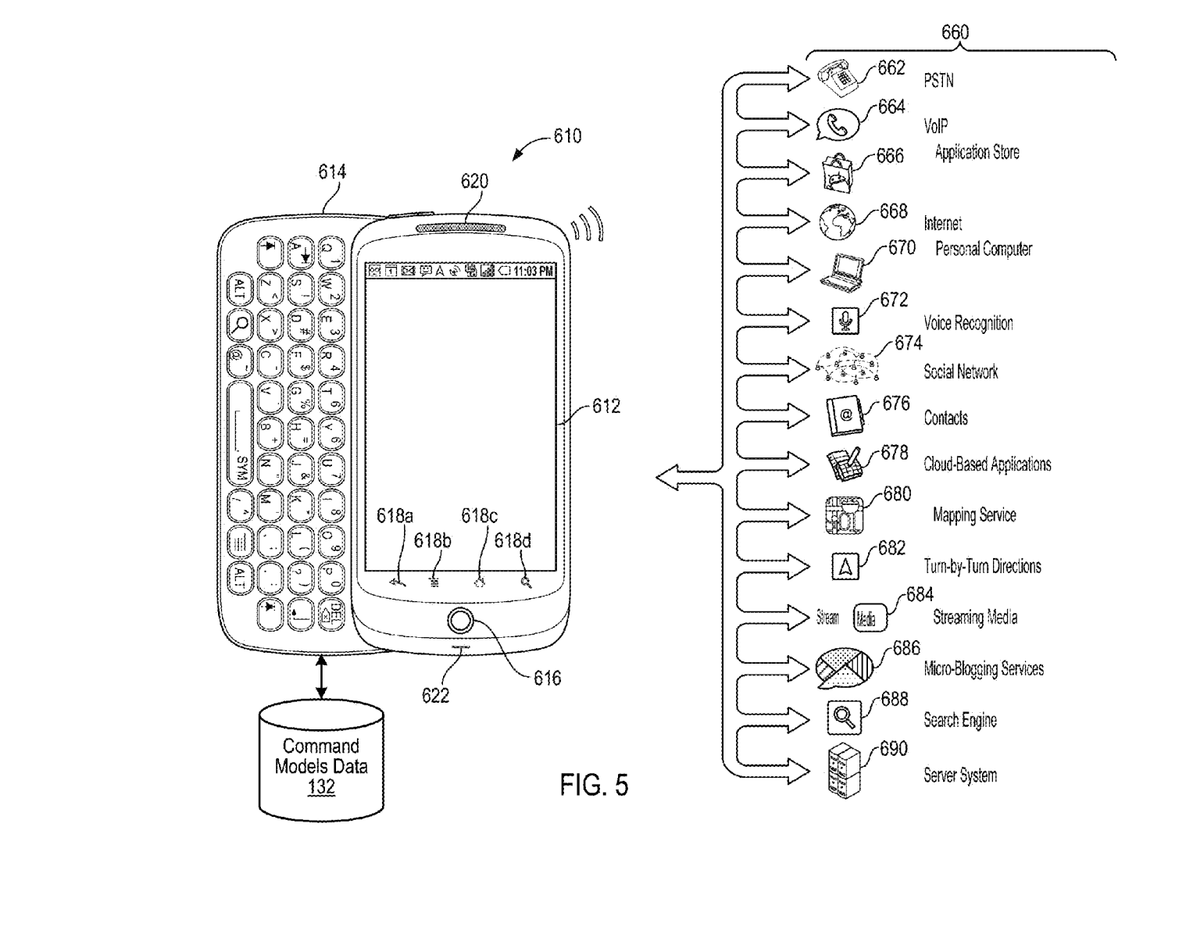
FIG. 5 is a block diagram of an example mobile computing device.

FIG. 5 is a block diagram of an example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as many various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 614. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 132 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an address corresponding to the web page or selecting a link to the web page.

A service provider that operates the network of base stations may connect the mobile computing device 610 to the network 660 to enable communication between the mobile computing device 610 and other computing systems that provide services 660. The services 660 may be provided over different networks (e.g., the service provider's internal network, the Public Switched Telephone Network, and the Internet). The service provider may operate a server system that routes information packets and voice data between the mobile computing device 610 and computing systems associated with the services 660.

An application store 666 may provide a user of the mobile computing device 610 the ability to browse a list of remotely stored application programs that the user may download over the network and install on the mobile computing device 610. The application store 666 may serve as a repository of applications developed by third-party application developers. An application program that is installed on the mobile computing device 610 may be able to communicate over the network with server systems that are designated for the application program. For example, a VoIP application program may be downloaded from the Application Store 666, enabling the user to communicate with the VoIP service 664.

The mobile computing device 610 may access content on the internet 668 through a network 102. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through the network. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the computing device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn directions service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   accessing command input logs storing data defining received input sentences, each input sentence being one or more n-grams;
   identifying from the input sentences first input sentences that do not successfully parse by any parsing rule in a set of parsing rules, each of the parsing rules being associated with an action, and wherein each parsing rule causes a user device to perform the action associated with the parsing rule in response to an input sentence received from the user device being successfully parsed by the parsing rule;

for each first input sentence, determining whether the first input sentence has an underserving signal, the underserving signal being a signal that is indicative of one or more actions being underserved; and selecting first input sentences determined to have an underserving signal as candidate input sentences;

providing each candidate input sentence to an action analysis process that determines whether a candidate input sentence is to be associated with one of a plurality of actions and upon a positive determination generates a parsing rule for the candidate input sentence, wherein the generated parsing rule is associated with the one of the plurality of actions and a successful parse of an input sentence received at a user device by the generated parsing rule causes the user device to perform the one of the plurality of actions associated with the generated parsing rule; and persisting each generated parsing rule and data describing the action with which the generated parsing rule is associated to command models data that is accessible by a language processing system that parses command input sentences by the generated parsing rules and determines actions to perform based on a successful parses.

2. The computer-implemented method of claim 1, wherein determining whether the first input sentence has an underserving signal comprises, for each first input sentence:

selecting n-grams included in the first input sentence;

for each selected n-gram, determining whether the n-gram is semantically relevant for an action that has an associated parsing rule; and determining the first input sentence has the underserving signal when the n-gram is determined to be semantically relevant for an action that has an associated parsing rule.

3. The computer-implemented method of claim 2, wherein determining whether the first input sentence has an underserving signal further comprises, for each first input sentence:

determining that the first input sentence was processed as a search query;

determining a quality metric value for search results provided in response to the search query; and determining the first input sentence has the underserving signal when the quality metric value does not meet a threshold quality value.

4. The computer-implemented method of claim 3, wherein determining a quality metric value for search results provided in response to the search query comprises determining a quality score that is a measure of quality of resources identified by the search results, the measure of quality being independent of user interactions at the user device from which the input sentence was received.

5. The computer-implemented method of claim 3, wherein determining a quality metric value for search results provided in response to the search query comprises determining a quality score that is a measure of user satisfaction in response to the search results, the measure of user satisfaction being dependent on user interactions with the search results at the user device from which the input sentence was received.

6. The computer-implemented method of claim 1, wherein determining whether the first input sentence has an underserving signal further comprises, for each first input sentence:

determining that the first input sentence was processed as a search query;

determining a quality metric value for search results provided in response to the search query; and determining the first input sentence has the underserving signal when the quality metric value does not meet a threshold quality value.

7. The computer-implemented method of claim 6, wherein determining a quality metric value for search results provided in response to the search query comprises determining a quality score that is a measure of quality of resources identified by the search results, the measure of quality being independent of user interactions at the user device from which the first input sentence was received.

8. The computer-implemented method of claim 6, wherein determining a quality metric value for search results provided in response to the search query comprises determining a quality score that is a measure of user satisfaction in response to the search results, the measure of user satisfaction being dependent on user interactions with the search results at the user device from which the first input sentence was received.

9. The computer-implemented method of claim 1, wherein the input sentences are generated from voice command inputs.

10. The computer-implemented method of claim 1, wherein the parsing rules are grammar based rules.

11. A non-transitory computer readable storage medium storing instructions executable by a data processing apparatus and that upon such execution causes the data processing apparatus to perform operations comprising:

identifying from the input sentences first input sentences that do not successfully parse by any parsing rule in a set of parsing rules, each of the parsing rules being associated with an action, and wherein each parsing rule causes a user device to perform the action associated with the parsing rule in response to an input sentence received from the user device being successfully parsed by the parsing rule;

for each first input sentence, determining whether the first input sentence has an underserving signal, the underserving signal being a signal that is indicative of one or more actions being underserved; and selecting first input sentences determined to have an underserving signal as candidate input sentences;

providing each candidate input sentence to an action analysis process that determines whether a candidate input sentence is to be associated with one of a plurality of actions and upon a positive determination generates a parsing rule for the candidate input sentence, wherein the generated parsing rule is associated with the one of the plurality of actions and a successful parse of an input sentence received at a user device by the generated parsing rule causes the user device to perform the one of the plurality of actions associated with the generated parsing rule; and persisting each generated parsing rule and data describing the action with which the generated parsing rule is associated to command models data that is accessible by a language processing system that parses command input sentences by the generated parsing rules and determines actions to perform based on a successful parses.

12. The non-transitory computer readable storage medium of claim 11, wherein determining whether the first input sentence has an underserving signal comprises, for each first input sentence:

selecting n-grams included in the first input sentence;

for each selected n-gram, determining whether the n-gram is semantically relevant for an action that has an associated parsing rule; and determining the first input sentence has the underserving signal when the n-gram is determined to be semantically relevant for an action that has an associated parsing rule.

13. The non-transitory computer readable storage medium of claim 12, wherein determining whether the first input sentence has an underserving signal further comprises, for each first input sentence:
determining that the first input sentence was processed as a search query;
determining a quality metric value for search results provided in response to the search query; and
determining the first input sentence has the underserving signal when the quality metric value does not meet a threshold quality value.

14. The non-transitory computer readable storage medium of claim 13, wherein determining a quality metric value for search results provided in response to the search query comprises determining a quality score that is a measure of quality of resources identified by the search results, the measure of quality being independent of user interactions at the user device from which the first input sentence was received.

15. The non-transitory computer readable storage medium of claim 13, wherein determining a quality metric value for search results provided in response to the search query comprises determining a quality score that is a measure of user satisfaction in response to the search results, the measure of user satisfaction being dependent on user interactions with the search results at the user device from which the first input sentence was received.

16. The non-transitory computer readable storage medium of claim 11, wherein determining whether the first input sentence has an underserving signal further comprises, for each first input sentence:
determining that the first input sentence was processed as a search query;
determining a quality metric value for search results provided in response to the search query; and
determining the first input sentence has the underserving signal when the quality metric value does not meet a threshold quality value.

17. The non-transitory computer readable storage medium of claim 16, wherein determining a quality metric value for search results provided in response to the search query comprises determining a quality score that is a measure of quality of resources identified by the search results, the measure of quality being independent of user interactions at the user device from which the first input sentence was received.

18. The non-transitory computer readable storage medium of claim 16, wherein determining a quality metric value for search results provided in response to the search query comprises determining a quality score that is a measure of user satisfaction in response to the search results, the measure of user satisfaction being dependent on user interactions with the search results at the user device from which the first input sentence was received.

19. The non-transitory computer readable storage medium of claim 11, wherein the input sentences are generated from voice command inputs.

20. A system, comprising:
a data processing apparatus; and
a non-transitory computer readable storage medium in data communication with the data processing apparatus storing instructions executable by the data processing apparatus and that upon such execution causes the data processing apparatus to perform operations comprising:
identifying from the input sentences first input sentences that do not successfully parse by any parsing rule in a set of parsing rules, each of the parsing rules being associated with an action, and wherein each parsing rule causes a user device to perform the action associated with the parsing rule in response to an input sentence received from the user device being successfully parsed by the parsing rule;
for each first input sentence, determining whether the first input sentence has an underserving signal, the underserving signal being a signal that is indicative of one or more actions being underserved; and
selecting first input sentences determined to have an underserving signal as candidate input sentences;
providing each candidate input sentence to an action analysis process that determines whether a candidate input sentence is to be associated with one of a plurality of actions and upon a positive determination generates a parsing rule for the candidate input sentence, wherein the generated parsing rule is associated with the one of the plurality of actions and a successful parse of an input sentence received at a user device by the generated parsing rule causes the user device to perform the one of the plurality of actions associated with the generated parsing rule; and
persisting each generated parsing rule and data describing the action with which the generated parsing rule is associated to command models data that is accessible by a language processing system that parses command input sentences by the generated parsing rules and determines actions to perform based on a successful parses.

* * * * *